US008724796B2

(12) United States Patent
Erhart et al.

(10) Patent No.: US 8,724,796 B2
(45) Date of Patent: May 13, 2014

(54) ESTIMATION OF EXPECTED VALUE FOR REMAINING WORK TIME FOR CONTACT CENTER AGENTS

(75) Inventors: George W. Erhart, Pataskala, OH (US); Andrew D. Flockhart, Thornton, CO (US); Valentine C. Matula, Granville, OH (US); David Skiba, Columbus, OH (US)

(73) Assignee: Avaya Inc., Basking Ridge, NJ (US)

( * ) Notice: Subject to any disclaimer, the term of this patent is extended or adjusted under 35 U.S.C. 154(b) by 3932 days.

(21) Appl. No.: 10/674,562

(22) Filed: Sep. 30, 2003

(65) Prior Publication Data
US 2005/0069119 A1   Mar. 31, 2005

(51) Int. Cl.
*H04M 3/00*   (2006.01)

(52) U.S. Cl.
USPC .................................. 379/265.06; 379/265.01

(58) Field of Classification Search
USPC ........ 375/265.01–265.14, 266.01–266.1, 309
See application file for complete search history.

(56) References Cited

U.S. PATENT DOCUMENTS

| | | | |
|---|---|---|---|
| 4,959,686 A | | 9/1990 | Spallone et al. |
| 5,206,903 A | | 4/1993 | Kohler et al. |
| 5,506,898 A | | 4/1996 | Costantini et al. |
| 5,790,974 A | | 8/1998 | Tognazzini |
| 5,799,065 A | * | 8/1998 | Junqua et al. ............... 379/88.03 |
| 5,825,869 A | | 10/1998 | Brooks et al. |
| 5,854,832 A | * | 12/1998 | Dezonno .................. 379/265.07 |
| 5,905,793 A | | 5/1999 | Flockhart et al. |
| 5,999,617 A | * | 12/1999 | Oyanagi et al. ............. 379/265.1 |
| 6,148,396 A | | 11/2000 | Chrysos et al. |
| 6,192,122 B1 | | 2/2001 | Flockhart et al. |
| 6,366,666 B2 | | 4/2002 | Bengtson et al. |
| 6,804,346 B1 | * | 10/2004 | Mewhinney ................ 379/265.1 |
| 7,236,583 B2 | * | 6/2007 | Beckstrom et al. ......... 379/265.1 |

FOREIGN PATENT DOCUMENTS

| | | |
|---|---|---|
| EP | 0 740 450 A2 | 4/1996 |
| EP | 0 855 826 A2 | 12/1997 |
| EP | 0 899 673 | 8/1998 |
| EP | 0 949 793 A1 | 3/1999 |
| GB | 2 293 724 | 4/1996 |
| GB | 2 339 643 | 2/2000 |
| JP | 2000020832 | 1/2000 |
| WO | WO 97/15136 | 4/1997 |

OTHER PUBLICATIONS

U.S. Appl. No. 09/675,729 entitled System for Automatically Predicting Availability of a Resource in a Customer Care Center Enviroment, Flockhart et al., filed Sep. 9, 2000.
U.S. Appl. No. 09/641,403, entilted Wait Time Prediction Arrangement for Non-Real-Time Customer Contacts, Flockart et al., filed Aug. 17, 2000.

* cited by examiner

*Primary Examiner* — William Deane, Jr.
(74) *Attorney, Agent, or Firm* — Muncy, Geissler, Olds & Lowe, P.C.

(57) ABSTRACT

The present invention provides a more accurate estimate as to time for completion of a call by using estimated time durations of separate phases of the call and by determining what phase a call is currently on. An important feature of the present invention is the use of automated speech processing techniques to estimate where the customer and agent are in their conversation and to gauge the rate of progress of the call.

21 Claims, 1 Drawing Sheet

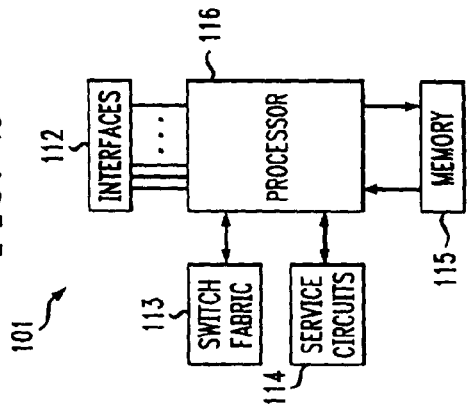
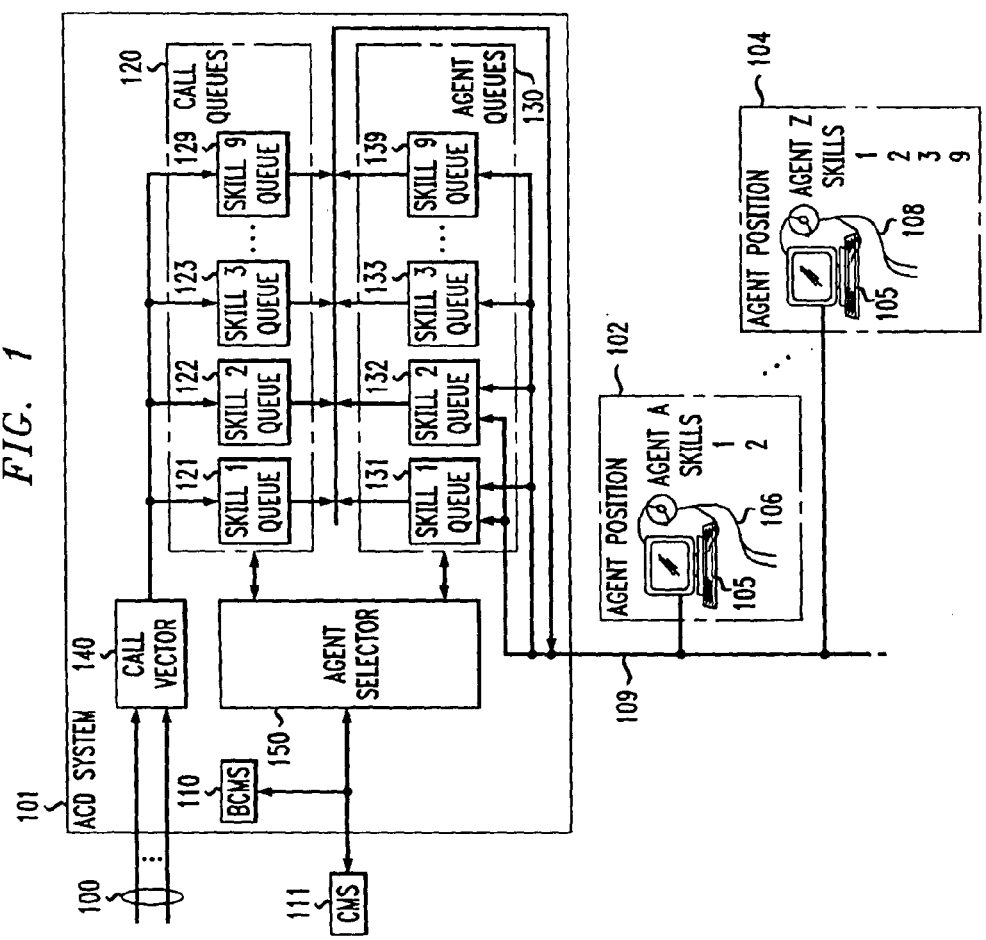

ESTIMATION OF EXPECTED VALUE FOR REMAINING WORK TIME FOR CONTACT CENTER AGENTS

FIELD OF THE INVENTION

The present invention relates generally to call centers of other call processing systems in which calls are distributed among a numbers of agents for handling.

BACKGROUND OF THE INVENTION

In a typical inbound contact center arrangement, customer service representatives handle a variety of incoming calls. For each new call that a single or multi-site set of call centers receives, decisions are made by call routing algorithms as to which site should handle a call, and then within the site, whether a call should be given to an available agent, or held in queue for an agent that is more likely to have the skills required to handle the call. An example of a prior art system which utilizes such algorithms is the Advocate System, marketed by Avaya Inc. of Basking Ridge, N.J.

In a typical outbound contact center, an effort is made to optimize performance of the agents by placing predictive dialing calls. A predictive dialing call is one that is placed in anticipation of an agent becoming free in the very near future. Should this prediction be incorrect, the called party answers the phone, hears no one on the other end, and hangs up. A potential customer, so treated, would be even less receptive to a subsequent call from an agent. For an outbound contact center, the decision of when to place a predictive dialing call is typically based on the expected remaining work time of all agents that might be able to handle the call about to be placed. It is in the best interests of both the outbound call center and the called party that this decision is made as accurately as possible.

One of the inputs to such predictive algorithms, either directly or via calculation, is the expected remaining work time of each agent. Today, this estimate is based on the average of all calls handled by the agent or by all agents. If the general type of call is known (due to the original number dialed by the customer, or selections made for routing using an interactive voice response (IVR) system, or information held in the customer record), the average can be computed for calls of a certain type. Considering types of calls in this manner improves the accuracy of the estimate by reducing the variance of the estimate.

Accordingly, in a typical current prior art systems, estimated remaining work time is calculated by determining the average call holding time for all calls of a class, and then subtracting the time an agent has spent on the call up to this point. It is well-known in the art that while such estimates can be fairly accurate when it entails a large call volume, as call volume decreases (e.g., based on time of day or day of week), predictors based on such estimates become far less accurate. In many instances, the actual length of the call will exceed the average call holding time, and thus the estimate will be zero or negative.

In all the above cases, the estimated remaining work time for a particular call to an agent is only a general estimate and does not take into account the current pace of the call in progress with the agent. A commonly owned, co-pending application, U.S. patent application Ser. No. 09/675,729 filed Sep. 29, 2000 and incorporated herein by reference, utilizes the fact that a call between an agent and a customer passes through distinct phases. By estimating time durations of these separate phases and by determining what phase a call is currently on, a more accurate estimate is derived as to time for completion of a call.

The present invention improves upon the prior art estimation techniques above by using additional information to estimate where the customer and agent are in their conversation on the call. With this information, a more accurate estimate can be determined of the remaining time of the call. This estimate is then provided well known routing algorithms to improve the results of the routing function.

SUMMARY OF THE INVENTION

The present invention provides a more accurate estimate as to time for completion of a call by using estimated time durations of separate phases of the call and by determining what phase a call is currently on. An important feature of the present invention is the use of automated speech processing techniques to estimate where the customer and agent are in their conversation and to gauge the rate of progress of the call.

BRIEF DESCRIPTION OF THE DRAWINGS

Various embodiments of the present invention will now be described in detail in conjunction with the annexed drawings, in which:

FIG. 1 is a block diagram of a call center in which one or more aspects of the present invention may be implemented;

FIG. 2 is a block diagram of an automatic call distribution (ACD) system implemented in the call center of FIG. 1.

DETAILED DESCRIPTION

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks, Internet Protocol (IP) networks, etc. The term "call center" as used herein is thus intended to include any type of ACD system, telemarketing system or other communication system which processes calls or other service requests. The term "call" as used herein is intended to include any of the above-noted types of communications as well as portions or combinations of these and other communications.

FIG. 1 shows an illustrative call center in which the present invention may be implemented. The call center includes a number of telephone lines and/or trunks 100 selectively interconnected with a plurality of agent positions 102-104 via an ACD system 101. Each agent position 102-104 includes a voice-and-data terminal 105 for use by a corresponding agent 106-108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

The ACD system 101 may be implemented in a manner similar to, for example, the Definity.RTM. PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric, to provide automatic call distribution functionality, and to provide storage of e-mails, faxes and other communications.

Referring again to FIG. 1, exemplary data elements stored in the memory 115 of ACD system 101 include a set of call queues 120 and a set of agent queues 130. Each call queue 121-129 in the set of call queues 120 corresponds to a different agent skill, as does each agent queue 131-139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121-129 based upon the agent skill that they require for proper handling. Agents 106-108 who are available for handling calls are assigned to agent queues 131-139 based upon the skills which they possess. An agent may have multiple skills, and hence may be assigned to multiple agent queues 131-139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131-139 at different expertise levels.

Call vectoring is described in greater detail in Definity.RTM. Communications System Generic 3 Call Vectoring/Expert Agent Selection (EAS) Guide, AT&T Publication No. 555-230-520, Issue 3, November 1993, which is incorporated by reference herein. Skills-based ACD techniques are described in greater detail in, for example, U.S. Pat. No. 5,206,903 issued Apr. 27, 1993 in the name of inventors J. E. Kohler et al. and entitled "Automatic Call Distribution Based on Matching Required Skills with Agents Skills," which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system.

Further details regarding call processing in a system such as ACD system 101 can be found in, for example, U.S. Pat. No. 5,905,793 issued May 18, 1999 in the name of inventors A. D. Flockhart et al. and entitled "Waiting-Call Selection Based on Anticipated Wait Times," and U.S. Pat. No. 6,192,122 issued Feb. 20, 2001 in the name of inventors A. D. Flockhart et al. and entitled "Call Center Agent Selection that Optimizes Call Wait Times," both of which are incorporated by reference herein.

In accordance with the present invention, the call center of FIG. 1 is configured to include capabilities for implementing the use of predictive algorithms which make use of the well-known fact that a call between an agent and a customer passes through distinct phases.

In one embodiment of the invention an estimate is determined of the probability that the call is currently in a given phase. Then, using historical data from the call center on length of time spent in each phase, the invention estimates the most likely time remaining that the current caller will remain in that current phase. Finally, by modeling the transitions from phase to phase to call termination, and summing the expected time that will be spent in each phase yet to be encountered during the call, the invention then provides an estimate of the remaining holding time that will be spent in each phase yet to be encountered during the call. In this manner, the invention obtains an estimate of the remaining holding time for the call.

Typically in prior art processing of call, an agent relies on an image on his computer screen to provide a "talking points" script and/or a template for gathering data. These screens are therefore usually encountered in a specific order. In the commonly owned, copending U.S. patent application Ser. No. 09/675,729 referenced above in the prior art discussion, a determination is made of which screen an agent had recently viewed, and to estimate average time to end of call based upon this input. The current invention identifies phases of a call, and then estimates the current phase the agent is in by reviewing a plurality of inputs. That is, the current invention utilizes more than recent screens viewed. In particular, it also considers automated speech processing results and other multimodal inputs such as a selection on a Personal Digital Assistant (PDA) during a voice/PDA call. Such automated speech processing techniques include Automatic Speech Recognition (ASR) wherein the presence of specific spoken words is detected. Further embodiments of the invention include additional well-known speech processing techniques which detect a speaker's accent, disfluency rate, speaking rate and other features of speech that have a potential impact on the progress of a call. That is, a speaker's speaking rate will directly effect the rate of information transfer and subsequently, the expected time of completion of the call. Similarly, an accented and/or disfluent speaker (e.g., speaker that stutters, restarts phrases, hesitates, uses filler words or phrases, etc.) will frequently take longer to communicate, adversely effecting the progress of the call. Still further embodiments of the invention would evaluate the proportion of time during the call or phase in which the customer is talking versus the agent talking. This proportion is indicative of a customer who is more (or less) verbose than normal thereby influencing the progress of the call. These additional embodiments of the invention take account one or more of these additional factors in determining the expected time of call completion.

Various embodiments of invention detect and estimate what phase a call is in at any given time. It is well known in the art that not every call will pass through all possible phases, and that some calls may even repeat phases (e.g., in a help desk situation, the caller may be asked to repeat their problem after an initial proposed solution has failed). In various embodiments of the invention the following mechanisms are employed:

1. Use of speech recognition to listen to the agent and/or the customer to detect the general topic of their current discussion. Use of various well-known prior art techniques (e.g., a combination of text analysis techniques such as neural networks, Latent Semantic Indexing, gisting, sequence package analysis, or word spotting) can then be used to estimate the probability that the conversation is in each possible phase for a short portion of the prior discussion heard. Additional embodiments of the invention then use this probability vector as input into a digital filtering process to estimate the current phase. As noted above, additional inputs to this filtering process can be parameters determined by various automated speech processing techniques (e.g., accent detection, speaking rate etc.) that effect the rate of progress of the call.

2. Agents commonly access a set of screens or forms to guide their interaction with the customer, and to input or retrieve information from a centralized business system database. The mere fact that a screen is displayed on the agent's workstation can identify the current phase of the call, or can be used as an input parameter to a digital filtering process or a Hidden Markov Model (HMM) in the same way that the speech technology-based estimate of call phase could be used as input into the HMM-based phase identification model. This method can thus derive estimated duration to end of call from the HMM even if the agent's use of the screens does not singularly indicate.

3. Use of the act of filling in the content of selected fields on the screen, along with the screen itself as input vectors to phase estimation model.

4. Use of a combination of the output of speech recognition module and of the agent interaction module can be used as input to a digital filtering process for phase state estimation.

Additional embodiments of the invention employ methods that model the flow from phase to phase within a call. These methods include:

1. An algorithm that identifies only the phases that occur immediately before most calls terminate. Then, when the call is not in one of these near-the-end phases, one can determine an estimate of the Remaining Expected Wait Time (REWT) as the difference of the Average Wait Time (AWT) and the call duration. That is, REWT=AWT−(call duration).

When the call enters a near-the-end phase, a more accurate value is calculated for REWT as being the difference of the AWT for the phase and the call duration within the phase. That is, REWT=(AWT-for-the-phase)−(call duration within the phase).

2. An algorithm to model the transition from phases as a HMM. The input vector to the model would be the output of the phase estimation algorithm, and the duration that the call has spent in that phase up to this point in time. Additional embodiments of the invention contemplate use of more complex feature components, to include, but not be limited to, the ratio of time this caller has spent in phases up to this point in time to the average time that all callers spend in phases up to this point in the call (to capture the "pace" of the call relative to all calls). Using the distribution of expected time within each phase, and the probability of transition between phases are used to calculate expected remaining work time for the call.

One embodiment of the present invention can be readily implemented on many existing prior art call centers by employing desktop wideband ASR to listen to the agent and then using automatic techniques to build a call classification model with two states:

1. Not within N seconds of end of call, or
2. Within N seconds of end of call.

Various additional embodiments of the invention permit the system, over a period of time, to learn automatically from the interaction of an agent with customers, to determine when it has a good model of the call flow, and then to begin analyzing calls form that point forward using call classification techniques to classify agents' utterances as "near the end" or not. Additional embodiments of the invention would identify additional states (e.g., end of call greater than 60 seconds away, end of call between 60 and 30 seconds, or end of call 30 seconds or less) to further improve the accuracy of the estimation process.

It will be understood that the forgoing description of the invention is by way of example only, and variations will be evident to those skilled in the art without departing from the scope of the invention, which is as set out in the appended claims.

What is claimed is:

1. A call management system for interconnecting a customer who is using a communication device, with one of a plurality of customer agents; said interconnection thereby establishing a service call, said call management system comprising:

means for segmenting said call into a plurality of phases;
means for predicting a current phase of said call from said plurality of phases; and,
means for estimating time remaining on said call;
wherein said means for estimating comprises a means for classifying said call into one of a plurality of call classes and means for performing methods of automatic speech analysis upon the service call and evaluating the proportion of time the customer speaks relative to time the agent speaks and using the proportion of time the customer speaks relative to the time the agent speaks to estimate the time remaining on said call.

2. The call management system of claim 1 wherein said methods of automatic speech analysis are selected from the group consisting of Automatic Speech Recognition, accent recognition, disfluency recognition, speaking rate categorization, and verbosity categorization.

3. The call management system of claim 2 further comprising:
- means for queuing additional calls awaiting an available agent from said plurality of customer agents;
- means for predicting the availability of an agent currently engaged in a service call based on said estimated time remaining on said call and,
- means for assigning one of said queued additional calls to said currently engaged agent.

4. The call management system of claim 3, wherein the call management system is an outbound contact center and wherein the system further comprises:
- means for originating an outbound call to a customer prior to the currently engaged agent completing the service call.

5. The call management system of claim 1 wherein said means for estimating further comprises evaluating status of a computer screen displayed to the agent.

6. The call management system of claim 1 wherein said means for estimating further comprises means for modeling the flow from one phase of said plurality of phases of the call to another phase of said plurality of phases of the call.

7. The call management system of claim 6, further comprising a feedback means for improving accuracy of said modeling means by utilizing feedback of when the call actually ended.

8. A method of operating a call management system for estimating the time remaining on a service call, wherein the call management system interconnects a customer who is using a communication device, with one of a plurality of customer agents; said interconnection thereby establishing said service call; said method comprising the call management system:
- segmenting said call into a plurality of phases;
- predicting a current phase of the call from said plurality of phases; and,
- estimating time remaining on said call using said predicted current phase,
- wherein said estimating step comprises steps of classifying said call into one of a plurality of call classes, performing methods of automatic speech analysis upon the service call, evaluating the proportion of time the customer speaks relative to time the agent speaks, and using the proportion of time the customer speaks relative to the time the agent speaks to estimate the time remaining on said call.

9. The method of claim 8 wherein said methods of automatic speech analysis are selected from the group consisting of Automatic Speech Recognition, accent recognition, disfluency recognition, speaking rate categorization, and verbosity categorization.

10. The method of claim 8 wherein said estimating step further comprises a step of evaluating status of a computer screen displayed to the agent.

11. The method of claim 8 wherein said estimating step further comprises a step of modeling the flow from one phase of said plurality of phases of the call to another phase of said plurality of phases of the call.

12. The method of claim 11 further comprising the step of improving accuracy of said modeling step by providing feedback of when the call actually ended.

13. A method of operating a call management system for estimating the time remaining on a service call, wherein the call management system interconnects a customer who is using a communication device with one of a plurality of customer agents, the interconnection thereby establishing the service call, said method comprising the call management system:
- defining a plurality of service calls phases;
- performing automated speech recognition on a conversation between the customer and one of the plurality of customer agents;
- determining the phase of the service call based on the outcome of said automated speech recognition step; and
- estimating the time remaining on the service call based on the phase of the call.

14. The method of claim 13 wherein estimating the time remaining on the service call includes estimating the time remaining on the service call based on an expected length of the determined phase.

15. The method of claim 13 wherein estimating the time remaining on the service call includes estimating the time remaining on the service call based on an expected length of the determined phase and on an expected length of any of the defined service call phases expected to occur before the end of the service call.

16. The method of claim 14 wherein estimating the time remaining on the service call includes evaluating the proportion of time the customer speaks relative to time the agent speaks.

17. The method of claim 14 wherein estimating the time remaining on the service call includes recognizing a level of disfluency of speech of the customer and adjusting the estimated time remaining on the service call based on the level of disfluency.

18. The method of claim 14 wherein estimating the time remaining on the service call includes determining a speaking rate of the customer and estimating the time remaining on the service call based on the speaking rate.

19. The method of claim 14 wherein estimating the time remaining on the service call includes categorizing the verbosity of the customer and estimating the time remaining on the service call based on the verbosity.

20. The method of claim 14 wherein estimating the time remaining on the service call includes categorizing the accent of the customer and estimating the time remaining on the service call based on the accent.

21. The method of claim 14 including evaluating the proportion of time the customer speaks relative to time the agent speaks and using the proportion of time the customer speaks relative to the time the agent speaks to estimate the time remaining on the service call.

* * * * *